US009264490B2

(12) United States Patent
Qi et al.

(10) Patent No.: US 9,264,490 B2
(45) Date of Patent: Feb. 16, 2016

(54) PROVIDING REGULATORY INFORMATION TO A GROUP OWNER FOR CHANNEL SELECTION IN A WIRELESS PEER-TO-PEER NETWORK

(75) Inventors: Emily H. Qi, Portland, OR (US); Oren Kaidar, Hillsboro, OR (US); Fabrice Labourasse, Sophia-Antipolis (FR); Wilfrid D'angelo, Mougins (FR)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 12/977,329

(22) Filed: Dec. 23, 2010

(65) Prior Publication Data

US 2012/0166671 A1 Jun. 28, 2012

(51) Int. Cl.
| G06F 15/16 | (2006.01) |
| H04L 29/08 | (2006.01) |
| H04L 12/715 | (2013.01) |
| H04W 76/04 | (2009.01) |
| H04W 84/12 | (2009.01) |

(52) U.S. Cl.
CPC .............. *H04L 67/104* (2013.01); *H04L 45/64* (2013.01); *H04W 76/043* (2013.01); *H04W 84/12* (2013.01)

(58) Field of Classification Search
CPC .................. H04L 29/06326; H04L 29/08306; H04L 29/06537; H04L 29/0836; H04L 67/104; H04L 45/64; H04W 76/043
See application file for complete search history.

(56) References Cited

U.S. PATENT DOCUMENTS

| 7,805,603 B2 | 9/2010 | Qi et al. | |
| 2006/0227753 A1* | 10/2006 | Vleugels | H04W 28/26 370/338 |
| 2009/0005090 A1* | 1/2009 | Hong et al. | 455/466 |
| 2009/0019173 A1* | 1/2009 | Wu | H04W 72/005 709/230 |
| 2009/0168787 A1* | 7/2009 | Ansari et al. | 370/401 |
| 2010/0081447 A1 | 4/2010 | Qi et al. | |
| 2010/0271959 A1 | 10/2010 | Qi et al. | |
| 2011/0010246 A1* | 1/2011 | Kasslin et al. | 705/14.64 |
| 2011/0026504 A1* | 2/2011 | Feinberg | H04W 4/08 370/338 |
| 2011/0034127 A1* | 2/2011 | Wentink | H04W 76/022 455/41.2 |
| 2011/0161697 A1* | 6/2011 | Qi | G06F 1/3209 713/320 |
| 2011/0188391 A1* | 8/2011 | Sella | H04W 24/10 370/252 |
| 2011/0243010 A1* | 10/2011 | Geirhofer et al. | 370/252 |
| 2011/0282989 A1* | 11/2011 | Geirhofer | H04W 28/18 709/224 |
| 2012/0166671 A1* | 6/2012 | Qi et al. | 709/236 |

OTHER PUBLICATIONS

"Wi-Fi Peer-to-Peer (P2P) Technical Specification" Version 1.1. established by the Wi-Fi Alliance Technical committee P2P Task Group Oct. 2010 pp. 1-159 (as cited in the IDS).*

(Continued)

*Primary Examiner* — Dhairya A Patel
(74) *Attorney, Agent, or Firm* — Grossman, Tucker, Perreault & Pfleger, PLLC

(57) ABSTRACT

In a wireless peer-to-peer (P2P) network or group, regulatory information may be provided from a P2P client device to a P2P group owner device for use in selection of an operating class and/or operating channel for the P2P group. The regulatory information may be obtained by the P2P client device, for example, by concurrently connecting to a wireless local area network (WLAN) infrastructure. The regulatory information may be formatted as a P2P action frame and may include regulatory domain information and/or supported channel information such as operating class and channel number.

33 Claims, 3 Drawing Sheets

(56) References Cited

OTHER PUBLICATIONS

"Wi-Fi Peer-to-Peer (P2P technical specification" Version 1.1 by Wi-Fi Alliance Technical committee P2P Task Group Oct. 2010 pp. 1-159 (as cited in IDS).*

"Wi-Fi Peer-to-Peer (P2P technical specification)" Version 1.1 by Wi-Fi Alliance Technical Committee P2P task Group Oct. 2010 pp. 1-159 (as cited in IDS).*

"IEEE Standard for Information technology—Telecommunications and information exchange between systems—Local and metropolitan area networks—Specific requirements: Part 11: Wireless LAN Medium Access Control (MAC) and Physical Layer (PHY) Specifications", IEEE Computer Society, IEEE Std 802.11™—2007, Jun. 12, 2007, 1232 pages.

"Wi-Fi Peer-to-Peer (P2P) Technical Specification", Version 1.1, established by the Wi-Fi Alliance Technical Committee P2P Task Group, Oct. 2010, pp. 1-159.

* cited by examiner

PROVIDING REGULATORY INFORMATION TO A GROUP OWNER FOR CHANNEL SELECTION IN A WIRELESS PEER-TO-PEER NETWORK

FIELD

The present disclosure relates to wireless peer-to-peer networks, and more particularly, relates to providing regulatory information, such as domain, operating class and channel information, to a group owner in a wireless peer-to-peer network for use in channel selection.

BACKGROUND

Wireless networks are capable of operating within multiple operating channels at different frequencies. The operating channels may be regulated depending upon the frequency band in which the channels operate and the geographic location of the wireless network. Operating channels in the 5 GHz range, for example, may be restricted and even prohibited by certain regulatory domains. A network controller, such as a wireless access point, may determine which operating channels are supported within the regulatory domain in which the network controller is located and may select operating channels accordingly.

In wireless peer-to-peer (P2P) networks, wireless devices are able to communicate directly without routing messages through a network controller such as a wireless access point. In a P2P network, a wireless device operating as a group owner (i.e., a P2P group owner device) may establish associations with and communications between other wireless devices (i.e., P2P client devices). Although the P2P group owner device in the P2P network acts similar to a wireless access point, the P2P group owner may not be able to connect concurrently to a wireless local area network (WLAN) infrastructure access point to obtain the regulatory domain information and/or supported channel information needed to determine the appropriate operating channels for use by the P2P network.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
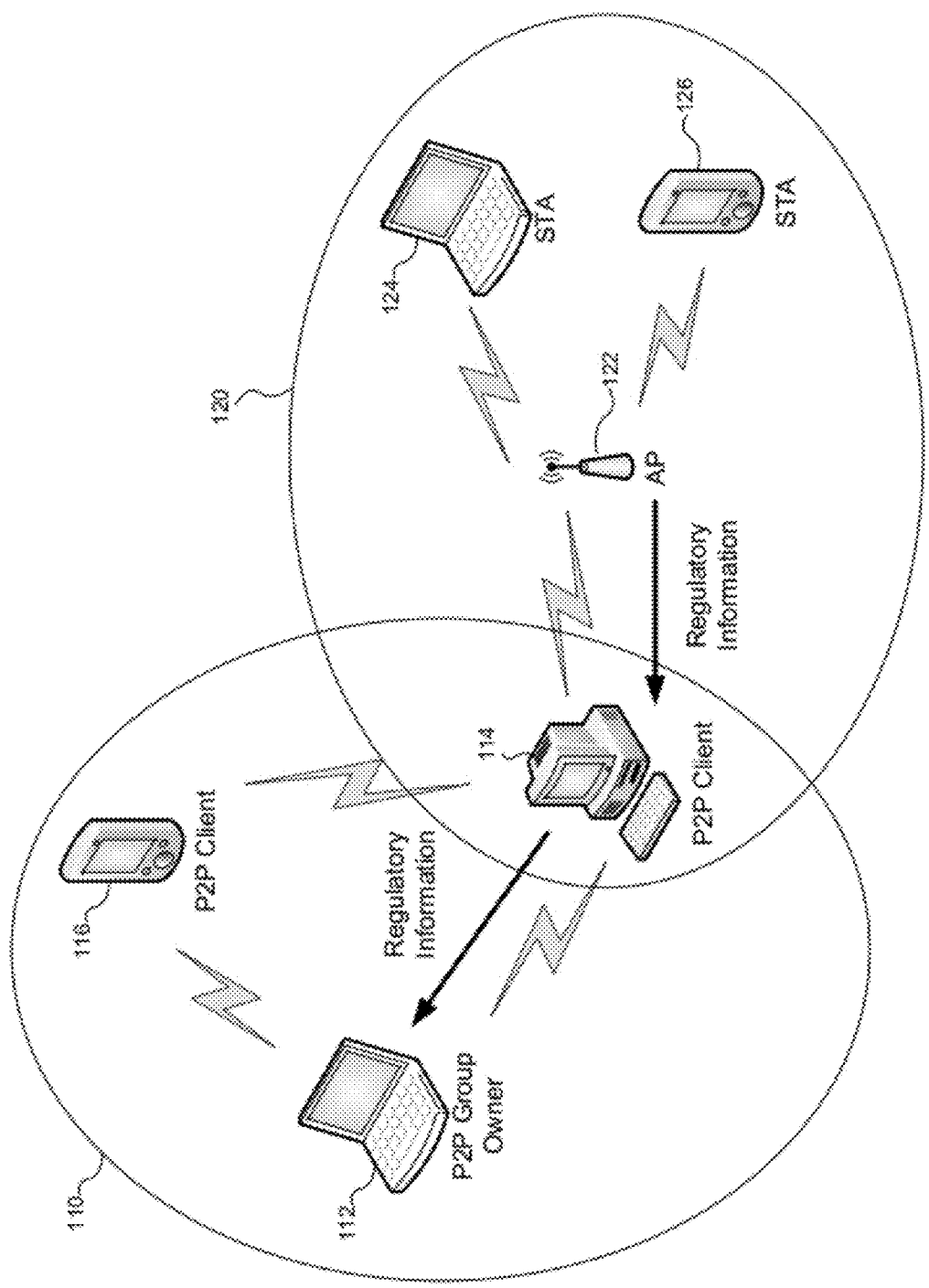
FIG. 1 is a schematic diagram illustrating a peer-to-peer (P2P) wireless network or group including a P2P client device capable of passing regulatory information from a wireless local area network (WLAN) infrastructure to a P2P group owner device, consistent with an embodiment of the present disclosure.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

In a wireless peer-to-peer (P2P) network or group, consistent with embodiments of the present disclosure described herein, regulatory information may be provided from a P2P client device to a P2P group owner device for use in selection of an operating class and/or operating channel for the P2P group. The regulatory information may be obtained by the P2P client device, for example, by concurrently connecting to a wireless local area network (WLAN) infrastructure. The regulatory information may be formatted as a P2P action frame and may include regulatory domain information and/or supported channel information such as operating class and channel number.

As used herein, a "wireless device" refers to a device having the capability of communicating wirelessly with one or more other wireless devices. The term "wireless" refers to a manner of communicating data by using modulated electromagnetic radiation (e.g., radio frequencies) through a non-solid medium (e.g., air). A wireless device may include at least one radio transceiver that transmits and receives radio frequency (RF) signals representing data and at least one processor that processes the data to be transmitted and the data that has been received. Examples of wireless devices include, but are not limited to, a wireless network interface controller (NIC), any device equipped with a wireless NIC, a desktop or laptop computer, a personal digital assistant (PDA), a tablet computing device, and a mobile telephone. A "wireless network" refers to one or more wireless devices configured to communicate wirelessly, for example, via one or more access points. One example of a wireless network is a wireless local area network (WLAN) that provides connectivity between wireless devices and operates in accordance with, at least in part, the IEEE 802.11 Wireless Local Area Network (WLAN) Standard, 802.11-2007 (hereinafter "IEEE 802.11-2007").

As used herein, "wireless P2P network" or "wireless P2P group" refers to one or more wireless devices configured to communicate directly with each other (e.g., without an access point) and a "P2P device" refers to a wireless device configured for communications within a wireless P2P network or group. One example of a wireless P2P group provides connectivity and operates in accordance with, at least in part, the Wi-Fi Peer-to-Peer (P2P) Technical Specification, Version 1.1, established by the Wi-Fi Alliance Technical Committee P2P Task Group (hereinafter "Wi-Fi Direct"). A "P2P group owner device" refers to a P2P device configured to operate as a group owner providing connectivity between P2P devices in the P2P group and a "P2P client device" refers to a P2P device connected to the P2P group owner in the P2P network. The term "operating channel" used herein refers to a frequency on which a P2P network or group is communicating and may be identified by a channel number within a frequency band. The term "operating class" refers to a category of one or more operating channels within a frequency band and having certain operating characteristics or parameters such as channel spacing, emissions, and power levels.

As used herein, "regulatory domain" refers to one or more countries, regions or geographical areas in which access to one or more wireless frequency bands is regulated by a regulatory body. The term "regulated operating channel" refers to an operating channel that is regulated within one or more regulatory domains. The term "regulatory class" refers to an operating class of one or more regulated operating channels within a regulated frequency band, which are subject to a set of regulations or restrictions, for example, as defined in IEEE 802.11-2007. The term "supported operating channel" refers to an operating channel in a regulatory class that is approved for operation within the regulatory domain in which a particular wireless network is located. The term "supported operating channel information" refers to an operating class or regulatory class and channel number that is approved for operation within the regulatory domain in which a particular wireless network is located. The term "regulatory information" refers to any information indicative of a regulatory domain, such as a country identifying information, and/or the supported operating channel(s) within the regulatory domain, such as supported operating channel information.

FIG. 1 illustrates a wireless P2P group 110 consistent with various embodiments of the present disclosure. The wireless P2P group 110 includes P2P devices, such as a P2P group owner device 112 and one or more P2P client devices 114, 116, which are associated and configured to communicate wirelessly and directly with each other on one or more selected operating channels. Although a certain number and type of P2P devices are shown, any number and type of P2P devices may be connected to form a wireless P2P group.

The P2P group owner device 112 initiates the formation of the P2P group 110 and facilitates the connectivity between the P2P client devices 114, 116, for example, by selecting the operating channel(s) and/or operating class for the P2P group 110. In one embodiment, the operating channels and classes include operating channels and classes within the frequency bands specified by IEEE 802.11-2007 including, for example, regulated operating channels within 2.4 GHz and 5 GHz regulatory classes. The P2P group 110 may also operate on operating channels within other frequency bands including other regulated frequency bands such as 60 GHz bands. Depending upon the geographic location of the P2P group 110, some of these operating channels or classes capable of being used by the P2P group 110 may not be supported by the regulatory domain.

Thus, the P2P group owner device 112 may be configured to operate within multiple regulatory classes and operating channels with only a subset of those operating channels and classes being supported operating channels or classes within the regulatory domain in which the P2P group owner device 112 and the P2P group 110 is operating. The P2P group owner device 112 may not initially have knowledge of the regulatory domain (or the supported channels), for example, because such information may not be included in the network interface controller (NIC) used in the P2P group owner device 112. Without having the regulatory information (e.g., regulatory domain or supported channel information), the P2P group owner device 112 may operate in operating channels or classes outside of certain regulatory classes, for example, channels within frequency bands that are less restricted (e.g., 2.4 GHz) by regulatory bodies than other frequency bands (e.g., 5 GHz).

In this illustrated embodiment, the P2P client device 114 is capable of concurrently connecting to the infrastructure of a WLAN 120, for example, via an access point 122 within a range or proximity of the P2P client device 114. The WLAN 120 may include one or more wireless devices such as stations 124, 126 connected to the access point 122, for example, in accordance with IEEE 802.11-2007. To establish concurrent operation, the P2P client device 114 may support multiple medium access control (MAC) entities, for example, in accordance with Wi-Fi Direct.

The P2P group owner device 112 in the P2P group 110 is not able to connect concurrently to the infrastructure of the WLAN 120, for example, because the access point 122 is not available within the proximity of the P2P group owner device 112 and/or the P2P group owner device 112 is not capable of concurrent operation. As a result, the P2P group owner device 112 is not able to obtain regulatory information from the infrastructure of the WLAN 120 for use in the selection of operating class and/or channels. The WLAN-connected P2P client device 114 may thus obtain regulatory information by connecting concurrently to the WLAN 120 and may pass the regulatory information to the P2P group owner device 112.

The regulatory information may be passed from the P2P client device 114 to the P2P group owner device 112 by formatting and transmitting the data within a protocol data unit (PDU), packet, or frame, for example, using a management frame format as defined by IEEE 802.11-2007 or a P2P action frame format as defined by Wi-Fi Direct. Although embodiments are described herein using frames formatted and exchanged in accordance with IEEE 802.11-2007 and Wi-Fi Direct, other standards or protocols may also be used to format and transmit the information. To provide security, the frame including the regulatory information may be a class 3 management or P2P action frame transmitted by the P2P client device 114 after association with the P2P group owner device 112 and protected, for example, in accordance with the IEEE 802.11w Protected Management Frames standard, 802.11w-2009. In one embodiment, the regulatory information may be transmitted during a request-response transaction initiated by the P2P client device 114, as described in greater detail below. In other embodiments, the regulatory information may be transmitted in response to a request from the P2P group owner device 112.

After receiving the regulatory information, the P2P group owner device 112 may then make channel selection decisions using the regulatory information. The P2P group owner device 112 may decide, for example, not to switch to a new operating channel in a new operating class because the new operating channel is in an operating class or regulatory class that is not supported by the regulatory domain as indicated by the received regulatory information. The P2P group owner device 112 may also decide to switch to a supported operating channel in a new operating class or regulatory class that is supported by the regulatory domain as indicated by the received regulatory information.

Figure 2A:
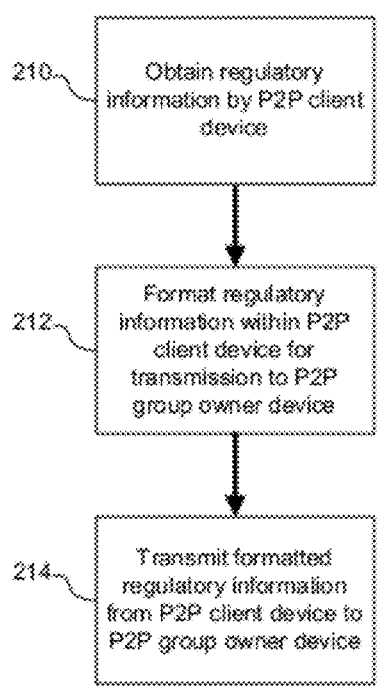
FIG. 2A is a flow chart illustrating a method of providing regulatory information, such as domain, operating class and channel information, to a P2P group owner for use in channel selection, consistent with an embodiment of the present disclosure.

FIG. 2A illustrates a method of providing regulatory information to a P2P group owner for use in channel selection. The regulatory information may be obtained 210 by at least one P2P client device within a P2P group (e.g., P2P client device 114 in P2P group 110) in which the P2P group owner is without access to a WLAN infrastructure. The P2P client device may obtain the regulatory information, for example, by concurrently connecting to a WLAN access point and receiving one or more frames including the regulatory information. In one embodiment, the regulatory information may be provided in a country information element (IE) in a management frame transmitted to the WLAN-connected P2P client device from the WLAN. The country IE contains the information (e.g., a country string, channel numbers, and/or regulatory class) to allow a WLAN station to identify the regulatory domain in which the station is located and to configure the WLAN station for operation in that regulatory domain, for example, in accordance with IEEE 802.11-2007.

The regulatory information may be formatted 212 within the P2P client device for transmission to the P2P group owner device, for example, within a P2P action frame. In a P2P action frame formatted by the P2P client device, the regulatory information may be provided in the form of a channel list attribute including a country string, operating class, and channel list as defined by Wi-Fi Direct. In other words, the regulatory information (e.g., country string, regulatory class, and channel numbers) in the country IE received by the WLAN-connected P2P client device from the WLAN infrastructure may be included in a P2P action frame for transmission in a P2P group.

The formatted regulatory information may then be transmitted 214 from the P2P client device to the P2P group owner device, for example, by transmitting the P2P action frame including the channel list attribute to the P2P group owner device. The formatted regulatory information may be transmitted by the P2P client during a channel selection request-response transaction initiated by the P2P client device, for example, as described below. The formatted regulatory information may also be transmitted by the P2P client in response to a request from the P2P group owner for regulatory information.

Figure 2B:
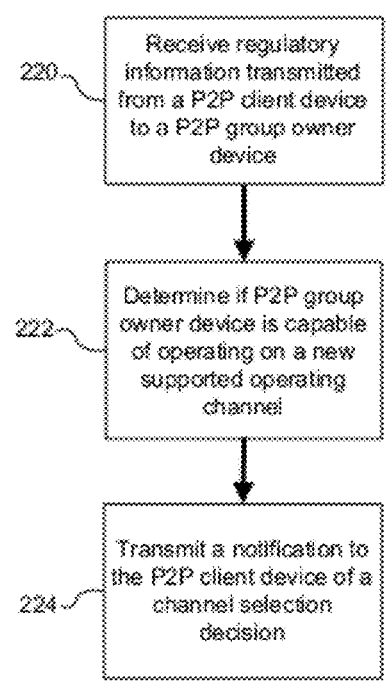
FIG. 2B is a flow chart illustrating a method of obtaining regulatory information in a P2P group owner for use in channel selection, consistent with an embodiment of the present disclosure.

FIG. 2B illustrates a method of obtaining regulatory information in a P2P group owner for use in channel selection. Regulatory information transmitted from a P2P client device may be received 220 in a P2P group owner device in a P2P group (e.g., the P2P group owner device 112 in P2P group 110). The regulatory information may be transmitted, for example, in the form of a P2P action frame as described above. The P2P group owner device may then determine 222 if the P2P group owner device is capable of operating on one or more supported operating channels in a new operating class supported by a regulatory domain in which the P2P group is located as indicated by the regulatory information. The supported operating channel(s) in the new operating class may include operating channels in a regulatory class, which was previously unavailable to the P2P group owner when the P2P group owner was without knowledge of the regulatory domain. The P2P group owner may determine that operation on a supported operating channel in a new operating class is not possible due to other obligations or lack of capability, or the P2P group owner may determine that operation on a supported operating channel in a new operating class is possible.

The P2P group owner device may then transmit 224 a notification to the P2P client device of a channel selection decision. The channel selection decision may include a decision not to switch to a supported operating channel in a new operating class, a decision to switch automatically to a supported operating channel in a new operating class, or a decision to switch to a supported operating channel in a new operating class upon receiving a request from the P2P client device. If the P2P group owner device decides to switch automatically, the P2P group owner device may transmit a beacon frame on the new supported operating channel in the new operating class, for example, in accordance with Wi-Fi Direct. If the P2P device decides to switch upon receiving a request form the P2P client device, the P2P group owner device may listen for a probe request frame or association request frame from the P2P client device on a supported operating channel in the new supported operating class and may then transmit a beacon frame on the supported operating channel in the new supported operating class, for example, in accordance with Wi-Fi Direct.

Figure 3:
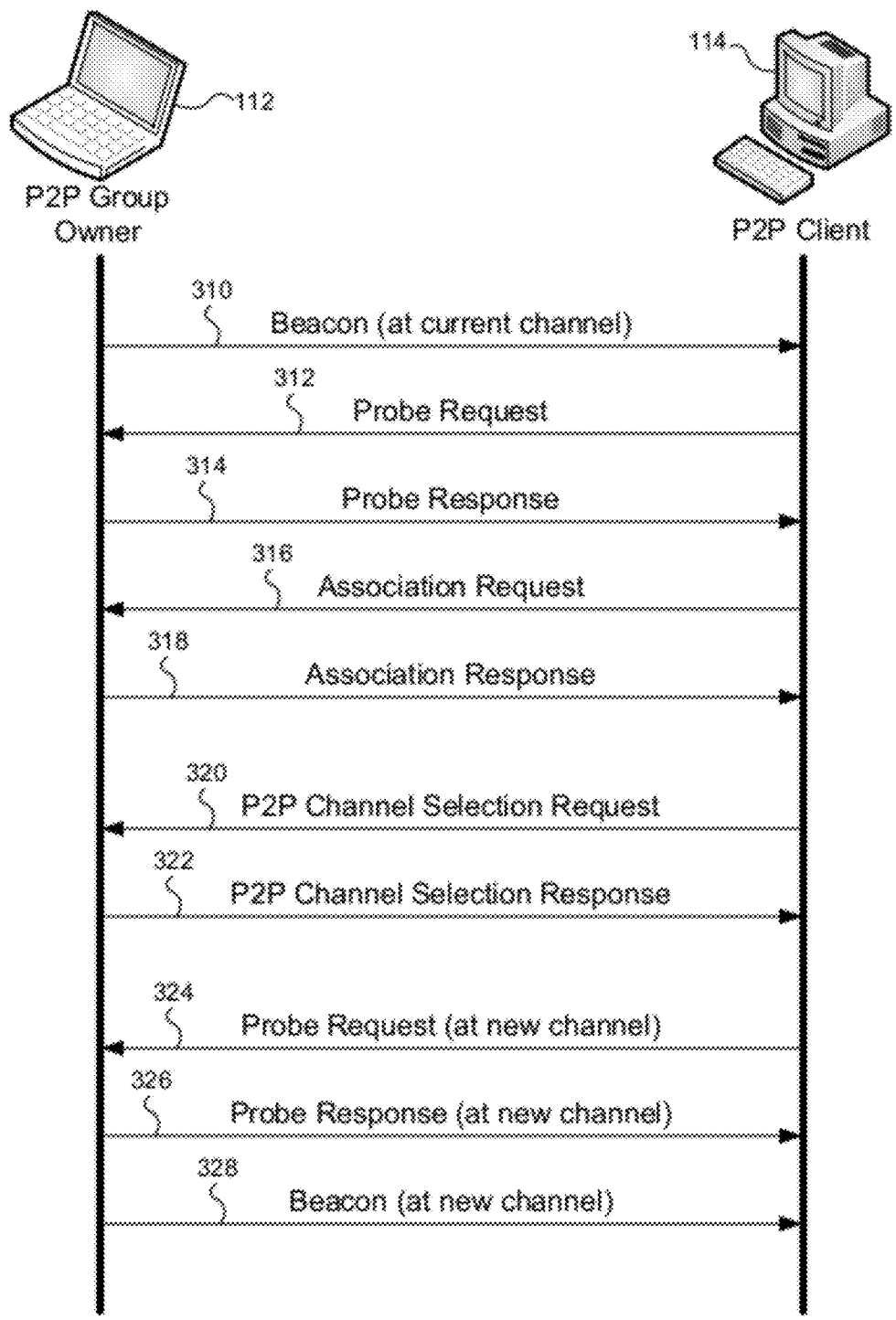
FIG. 3 is a diagram illustrating an exchange of frames between a P2P group owner device and a P2P client device to provide regulatory information and to facilitate channel selection, consistent with an embodiment of the present disclosure.

FIG. 3 illustrates one example of P2P transactions and frames for providing regulatory information to a P2P group owner device and for effecting a switch to a new supported operating channel in a new operating class. As shown, a P2P group owner device 112 may transmit a beacon frame 310 on a current operating channel to announce the presence of the P2P group operating on the current operating channel. When regulatory information is not yet available to the P2P group owner, the current operating channel may be within a frequency band (e.g., 2.4 GHz) that is accepted or less restricted by most regulatory bodies.

To discover the P2P group operating on the current operating channel in the current operating class, the P2P client device 114 may transmit a probe request frame 312 and the P2P group owner device 112 may transmit a probe response frame 314. To connect to the P2P group, the P2P client device 114 may transmit an association request frame 316 and the P2P group owner 112 may transmit an association response frame 318. The probe request-response transaction and the association request-response transaction may be conducted, for example, in accordance with Wi-Fi Direct. The P2P client device 114, with knowledge of the regulatory information, may also perform active scanning (e.g., transmitting probe request frames) on a new operating channel to determine if the P2P group owner device 112 is operating on the new operating channel. If the new operating channel is a regulated operating channel within a certain regulatory class and the P2P group owner device 112 is without knowledge of the regulatory information, the P2P group owner device 112 may respond to the P2P client device 112 indicating that the new operating channel is not supported.

The P2P client device 114 may then transmit a channel selection request frame 320 in a P2P action frame format to the P2P group owner device 112 to provide regulatory information for use in channel selection. The channel selection request frame 320 may include a dialog token field set to a non-zero value selected by the P2P client device 114 to identify the channel selection request-response transaction. The elements field of the channel selection request frame 320 may include a P2P information element (IE) with the channel list attribute, for example, as defined by the Wi-Fi Direct specification.

The P2P group owner device 112 may then transmit a channel selection response frame 322 in P2P action frame format to indicate a channel selection decision of the P2P group owner. The channel selection response frame 322 may include a dialog token set to the value received in the corresponding channel selection request frame 320. The elements field in the channel selection response frame 322 may contain a P2P IE with a channel selection status attribute as described below and an extended channel switch announcement, for example, as defined in the IEEE 802.11-2007 specification. If the P2P group owner device 112 decides to switch to a supported operating channel in a new operating class (e.g., from one of the supported operating channels or classes identified in the channel list attribute), the extended channel switch announcement may include a new operating class, channel number and value of channel switch count.

The channel selection status attribute may be used to provide the channel selection decision information and may be formatted, for example, as defined by the Wi-Fi direct specification. One example of the channel selection status attribute includes an attribute ID field to identify the type of attribute, a length field to indicate the length of the following fields in the attribute, and one or more status code fields to provide the status of a channel selection decision. The status code fields may include, for example, a bit (e.g., Bit 0) to indicate whether or not the P2P group owner device is capable of switching to a supported operating channel identified in the channel list provided in the channel selection request frame 320. One bit value (e.g., Bit 0 set to 0) may indicate an ACK (or acknowledgment) of a channel switch and another bit value (e.g., Bit 0 set to 1) may indicate a NACK (or negative acknowledgment) for the channel switch meaning that the P2P group owner device cannot perform the channel switch to any of the operating channels in the channel list due to other obligations or capabilities.

The status code in the channel selection status attribute may also include another bit (e.g., Bit 1) to indicate the manner of effecting or activating a channel switch. One bit value (e.g., Bit 1 set to 0) may indicate that the P2P group owner device will start automatically to transmit one or more beacon frames on an operating channel in a new operating class and another bit value (e.g., Bit 1 set to 1) may indicate that the P2P group owner device will not start transmission on an operating channel in a new operating class until the P2P group owner device receives a MAC Management Protocol Data Unit (MMPDU), such as a probe request frame or an association request frame, from a P2P client device on the operating channel in the new operating class.

In the illustrated example, the channel selection response frame 322 indicates a decision to operate on an operating channel in a new operating class, as suggested by the P2P client device 114, and to start transmission on the operating channel in the new operating class after receiving an MMPDU from a P2P client device. If the P2P group owner device 112 indicates such a decision, the P2P client device 114, with knowledge of the regulatory information and compliant with regulatory requirements, transmits a probe request frame 324 first to inform the P2P group owner device 112 that operation on the operating channel in the new operating class is permitted. Thus, if the operating channel in the new operating class is a regulated operating channel within a certain regulatory class, a P2P group owner device without knowledge of regulatory information is assured that the operating channel in the new operating class is permitted for operation by first receiving the MMPDU frame from the P2P client device 114 on the operating channel before transmitting any frame on the operating channel in the new operating class.

When the P2P client device 114 transmits a probe request frame 324 on the supported operating channel in the new supported operating class, the P2P group owner device 112 transmits a probe response frame 326 on the supported operating channel in the new operating class and then transmits a beacon frame 328 on the supported operating channel in the new operating class to announce the operation of the P2P group on the supported operating channel in the new operating class. If the channel selection response frame 322 indicates a decision to switch automatically, the P2P group owner device 112 may transmit the beacon frame 328 immediately without waiting for the probe request frame 324 or some other MMPDU from the P2P client device 114.

The P2P group owner device 112 and/or the P2P client device 114 may also use a timeout to return to an original or previous group operating channel after a period of time. If the P2P group owner device 112 and/or the P2P client device 114 do not receive a transmission on the supported operating channel in the new operating class after a period of time, for example, the P2P device will switch back to the previous operating channel. The timeout may be greater than an announced configuration timeout.

Accordingly, regulatory information may be provided to a P2P group owner device in a wireless P2P network or group for use in channel selection when the P2P group owner device is without knowledge of the regulatory domain and/or supported operating channels. In particular, the systems, methods, and apparatuses describe herein may facilitate switching to an operating channel in the 5 GHz range, for example, which may be better for a wireless display stream in a Wi-Fi Personal Area Network (PAN). The systems, methods, and apparatuses describe herein may also facilitate switching to a specific operating channel to be used by a P2P client for a file transfer in a Wi-Fi PAN.

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing platform, device or system, computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware.

Consistent with one embodiment, a method includes: obtaining regulatory information by at least one P2P client device within a P2P group, the P2P group including a P2P group owner device without access to a WLAN infrastructure; formatting the regulatory information within the P2P client device for transmission to the P2P group owner device; and transmitting the formatted regulatory information from the P2P client device to the P2P group owner device.

Consistent with another embodiment, a method includes: receiving regulatory information transmitted from a P2P client device to a P2P group owner device within a P2P group, the P2P group owner device being without access to a WLAN infrastructure; determining if the P2P group owner device is capable of operating on at least one supported operating channel in a new operating class supported by a regulatory domain in which the P2P group is located as indicated by the regulatory information, wherein the at least one supported operating channel in the new operating class is in a regulatory class previously unavailable to the P2P group owner device without knowledge of the regulatory information; and transmitting a notification to the P2P client device of a channel selection decision.

Consistent with a further embodiment, an apparatus includes a wireless P2P device including a processor and a radio transceiver. The wireless P2P device is configured to operate as a P2P client device or a P2P group owner device. The wireless P2P device, operating as a P2P client device, is configured to obtain regulatory information, to format the regulatory information for transmission to a P2P group owner device in a P2P group, and to transmit formatted regulatory information to the P2P group owner device in the P2P group. The wireless P2P device, operating as a P2P group owner device, is configured to receive regulatory information from a P2P client device in a P2P group, to determine a capability of operating on at least one new supported operating channel, and to transmit a notification of a channel selection decision to the P2P client device in the P2P group.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method comprising:
   obtaining regulatory information by at least one P2P client device within a P2P group; the P2P group including a P2P group owner device; wherein the P2P client device is configured to concurrently connect with a WLAN infrastructure access point outside of the P2P group; and wherein the P2P group owner device is without access to the WLAN infrastructure access point;
   formatting the regulatory information within the P2P client device for transmission to the P2P group owner device, said formatting including formatting a P2P action frame including the regulatory information, the P2P action frame including a channel selection request frame identifying at least one supported operating class and channel;
   transmitting the formatted regulatory information from the P2P client device to the P2P group owner device; and
   receiving a channel selection response frame from the P2P group owner device indicating a channel selection decision.

2. The method of claim 1, wherein the regulatory information includes regulatory domain information identifying a regulatory domain in which the P2P group is located.

3. The method of claim 2, wherein the regulatory domain information identifies a country.

4. The method of claim 1, wherein the regulatory information includes at least supported channel information identifying at least an operating class and at least one supported operating channel supported by a regulatory domain in which the P2P group is located.

5. The method of claim 1, wherein obtaining the regulatory information includes obtaining the regulatory information from the WLAN infrastructure.

6. The method of claim 1, wherein the channel selection decision indicates that the P2P group owner device is configured to operate on at least one new supported operating channel in a new operating class, and further comprising:
   responsive to the channel selection response frame, transmitting a request frame on the new supported operating channel in the new operating class to the P2P group owner device.

7. The method of claim 6 further comprising:
   switching back to a previous operating channel if at least one of a response frame or a beacon frame is not received from the P2P group owner device within a period of time.

8. The method of claim 1, wherein the new supported operating channel is in a 5 GHz regulatory class.

9. The method of claim 1, wherein the P2P action frame is a class 3 protected management frame.

10. A method comprising:
    receiving regulatory information by the P2P group owner device wherein: the regulatory information is formatted as a P2P action frame that is a channel selection request frame identifying at least one supported operating channel in a new operating class; the regulatory information is transmitted from a P2P client device; the P2P group owner device and P2P client device are within a P2P group; the P2P group owner device is without access to a WLAN infrastructure; and the P2P client device is configured to concurrently connect with the WLAN infrastructure access point and the P2P group owner;
    determining if the P2P group owner device is configured to operate on at least one supported operating channel in a new operating class supported by a regulatory domain in which the P2P group is located as indicated by the regulatory information, wherein the at least one supported operating channel in the new operating class is in a regulatory class previously unavailable to the P2P group owner device without knowledge of the regulatory information;
    transmitting a notification to the P2P client device of a channel selection decision; and
    transmitting a channel selection response frame from the P2P group owner device including the notification of the channel selection decision.

11. The method of claim 10, wherein the channel selection decision includes a decision not to switch to the supported operating channel in the new operating class.

12. The method of claim 10, wherein the channel selection decision includes a decision to switch to the supported operating channel in the new operating class, and further comprising switching automatically to the supported operating channel in the new operating class in the P2P group owner device.

13. The method of claim 10, wherein the channel selection decision includes a decision to switch to the supported operating channel in the new operating class, and further comprising switching to the supported operating channel in the new operating class in the P2P group owner device in response to receiving a request from the P2P client device.

14. The method of claim 10, wherein the channel selection decision includes a decision to switch automatically to a supported operating channel in the new operating class, and further comprising transmitting a beacon frame from the P2P group owner device on the supported operating channel in the new operating class.

15. The method of claim 10, wherein the channel selection decision includes a decision to switch to a supported operating channel in the new operating class, and further comprising:
    receiving a request frame from the P2P client device on the supported operating channel in the new operating class;
    transmitting a response frame to the P2P client device on the supported operating channel in the new operating class in response to receiving the request frame from the P2P client device on the supported operating channel in the new operating class; and transmitting a beacon frame from the P2P group owner device on the supported operating channel in the new operating class in response to receiving the request frame from the P2P client device on the supported operating channel in the new operating class.

16. The method of claim 10, further comprising:
transmitting a request for regulatory information from the P2P group owner device, wherein the regulatory information is transmitted by the P2P client device to the P2P group owner device in response to the request for the regulatory information.

17. A tangible, non-transitory computer-readable medium including instructions stored thereon which, when executed by one or more processors, cause the computer system to perform operations comprising:
obtaining regulatory information by at least one P2P client device within a P2P group, the P2P group including a P2P group owner device without access to a WLAN infrastructure, and a P2P client device with concurrent access to a WLAN infrastructure access point and the P2P group owner device;
formatting the regulatory information within the P2P client device for transmission to the P2P group owner device, said formatting including formatting a P2P action frame including the regulatory information, the P2P action frame including a channel selection request frame identifying at least one supported operating class and channel;
transmitting the formatted regulatory information from the P2P client device to the P2P group owner device; and
receiving a channel selection response frame from the P2P group owner device indicating a channel selection decision.

18. A tangible, non-transitory computer-readable medium including instructions stored thereon which, when executed by one or more processors, cause the computer system to perform operations comprising:
receiving regulatory information by a P2P group owner device within a P2P group wherein: the regulatory information is formatted as a P2P action frame that is a channel selection request frame identifying at least one supported operating channel in a new operating class; the regulatory information is transmitted from a P2P client device within the P2P group; the P2P group owner device is without access to the WLAN infrastructure; and the P2P client device has concurrent access to the WLAN infrastructure access point and the P2P group;
determining if the P2P group owner device is configured to operate on at least one supported operating channel in a new operating class supported by a regulatory domain in which the P2P group is located as indicated by the regulatory information, wherein the at least one supported operating channel in the new operating class is in a regulatory class previously unavailable to the P2P group owner device without knowledge of the regulatory information;
transmitting a notification to the P2P client device of a channel selection decision; and
transmitting a channel selection response frame from the P2P group owner device including the notification of the channel selection decision.

19. A P2P client device comprising circuitry to:
obtain regulatory information, wherein the P2P client device is configured to be part of a P2P group including a P2P group owner device; wherein the P2P client device is configured to concurrently connect with a WLAN infrastructure access point outside of the P2P group; and wherein the P2P group owner device is without access to the WLAN infrastructure access point;
format the regulatory information within the P2P client device for transmission to the P2P group owner device; and
transmit the formatted regulatory information from the P2P client device to the P2P group owner device;
wherein the circuitry to format the regulatory information further includes circuitry to format a P2P action frame including the regulatory information and a channel selection request frame identifying at least one supported operating class and channel; and
receive a channel selection response frame from the P2P group owner device indicating a channel selection decision.

20. The device of claim 19, wherein the regulatory information includes regulatory domain information identifying a regulatory domain in which the P2P group is located.

21. The device of claim 20, wherein the regulatory domain information identifies a country.

22. The device of claim 19, wherein the regulatory information includes at least supported channel information identifying at least an operating class and at least one supported operating channel supported by a regulatory domain in which the P2P group is located.

23. The device of claim 19, wherein the circuitry to obtain the regulatory information further includes circuitry to obtain the regulatory information from the WLAN infrastructure.

24. The device of claim 19, wherein the channel selection decision indicates that the P2P group owner device is configured to operate on at least one new supported operating channel in a new operating class, and wherein the P2P client device further comprises circuitry, responsive to the channel selection response frame, to transmit a request frame on the new supported operating channel in the new operating class to the P2P group owner device.

25. The device of claim 19, further comprising circuitry to:
switch back to a previous operating channel if at least one of a response frame or a beacon frame is not received from the P2P group owner device within a period of time.

26. The device of claim 19, wherein the new supported operating channel is in a 5 GHz regulatory class.

27. The device of claim 19, wherein the P2P action frame is a class 3 protected management frame.

28. A P2P group owner device comprising circuitry to:
receive regulatory information formatted as a P2P action frame that is a channel selection request frame identifying at least one supported operating channel in a new operating class, transmitted from a P2P client device; wherein the P2P group owner device and P2P client device are within a P2P group; wherein the P2P group owner device is without access to a WLAN infrastructure, and the P2P client device is configured to concurrently connect with the WLAN infrastructure access point and the P2P group owner;
determine if the P2P group owner device is configured to operate on at least one supported operating channel in a new operating class supported by a regulatory domain in which the P2P group is located as indicated by the regulatory information, wherein the at least one supported operating channel in the new operating class is in a regulatory class previously unavailable to the P2P group owner device without knowledge of the regulatory information;
transmit a notification to the P2P client device of a channel selection decision; and wherein the P2P group owner device further comprises circuitry to transmit a channel selection response frame including the notification of the channel selection decision.

29. The device of claim 28, wherein the channel selection decision includes a decision not to switch to the supported operating channel in the new operating class.

30. The device of claim 28, wherein the channel selection decision includes a decision to switch to the supported operating channel in the new operating class, and wherein the P2P group owner device further comprises circuitry to switch automatically to the supported operating channel in the new operating class.

31. The device of claim 28, wherein the channel selection decision includes a decision to switch to the supported operating channel in the new operating class, and wherein the P2P group owner device further comprises circuitry to switch to the supported operating channel in the new operating class in response to receiving a request from the P2P client device.

32. The device of claim 28, wherein the channel selection decision includes a decision to switch automatically to a supported operating channel in the new operating class, and wherein the P2P group owner device further comprises circuitry to transmit a beacon frame on the supported operating channel in the new operating class.

33. The device of claim 28, wherein the channel selection decision includes a decision to switch to a supported operating channel in the new operating class, and wherein the P2P group owner device further comprises circuitry to:
- receive a request frame from the P2P client device on the supported operating channel in the new operating class;
- transmit a response frame to the P2P client device on the supported operating channel in the new operating class in response to receiving the request frame from the P2P client device on the supported operating channel in the new operating class; and
- transmit a beacon frame on the supported operating channel in the new operating class in response to receiving the request frame from the P2P client device on the supported operating channel in the new operating class.

* * * * *